Aug. 29, 1950     W. E. BARNES     2,520,302

PRESSURE REGULATOR FOR FLOAT SYSTEMS

Filed Sept. 9, 1944

WITNESS:
Robt R Kitchel

INVENTOR
William E. Barnes
BY
Busser and Harding
ATTORNEYS.

Patented Aug. 29, 1950

2,520,302

UNITED STATES PATENT OFFICE 2,520,302

PRESSURE REGULATOR FOR FLOAT SYSTEMS

William E. Barnes, Beaumont, Tex., assignor to Sun Oil Company, Philadelphia, Pa., a corporation of New Jersey Application September 9, 1944, Serial No. 553,431

3 Claims. (Cl. 137—69)

In the production of crude oil from high pressure wells, it is customary procedure to deliver the product, consisting of a mixture of liquid and gaseous components, from the formation to a separating chamber wherein the liquid components settle to the bottom to be discharged while the gaseous components leaving the separator are either sold as natural gas, vented to the air and burned, or in some instances, repressured and returned to the same or another formation. The removal of the liquid from the separator is controlled by a float positioned at a predetermined level within the separator and arranged to effect the opening and closing of a discharge valve in accordance with variations in liquid level as it separates from the flowing gas. The force of the float is usually insufficient to operate the discharge valve directly, and it is the usual practice to utilize a portion of the gas from the separator to actuate the discharge valve directly, and to control the flow of the gas to the discharge valve in accordance with the movement of the float in the separator.

Since the gaseous components of the mixture entering the separator are usually at too high a presssure to be used directly in operating the discharge valve, it is necessary to reduce this pressure down to around 5 to 100 pounds in order to be placed in a pressure range suitable for that use. This pressure reduction effects an extreme cooling of the gas and gives rise to the formation of hydrates, which tend to plug the low pressure gas lines, thus preventing the proper operation of the discharge valve. The pressures, as high as 5000 pounds per square inch, at which the separators operate, also present a problem in designing a float that will not collapse and still be light enough to float.

The present invention contemplates an assembly of elements arranged in a manner to efficiently and automatically remove from a high pressure separator liquid from a gas-liquid mixture, and also to improved elements for accomplishing this result.

For a more complete understanding of the invention, reference may be made to the accompanying drawings in which.

Figure 1:
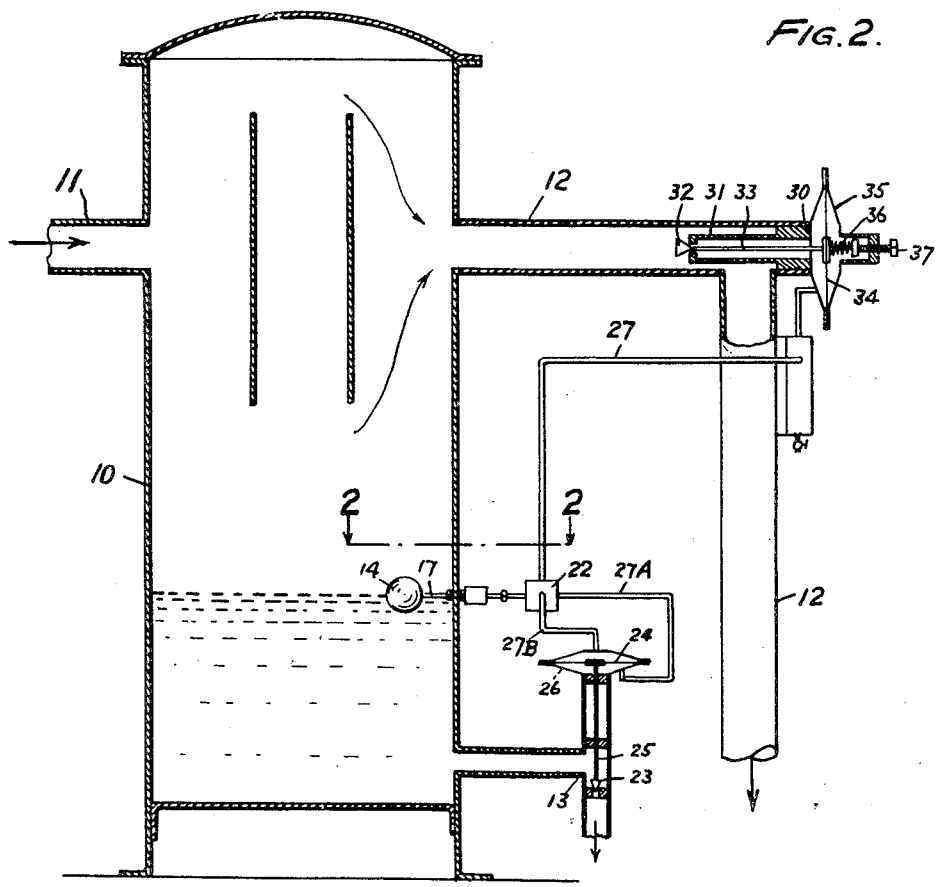
Fig. 1 is an assembled view of the apparatus generally in vertical section to show details.

In Fig. 1, 10 indicates a high pressure separator to which is delivered through conduit 11, the gas-oil mixture from a producing well. The liquid phase of the mixture settles in the separator and will attain some level, such as that arbitrarily chosen and indicated by the heavy dash line extending horizontally across the separator, while the gas phase of the mixture will fill the portion of the separator above the liquid level. The pressure of the gas coming from the well formation is frequently of the order of 5000 pounds per square inch. This gas is discharged continuously from the separator through conduit 12, to be used for repressuring, vented to the air and burned, or marketed. The liquid is discharged as it collects in the bottom of the separator through conduit 13, so as to maintain the fluid level between upper and lower limits set by the design of the separator.

Figure 2:
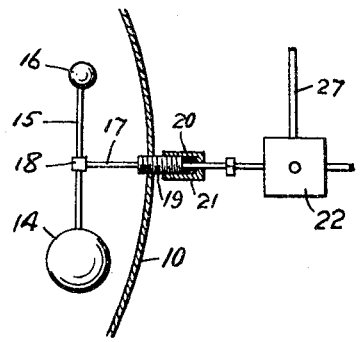
Fig. 2 is a fragmental horizontal section taken on the line 2—2 of Fig. 1.

The discharge of liquid through conduit 13 is controlled by a float system which is designed to operate at pressures upwardly of 5000 pounds per square inch, and includes as one essential part, a float device of solid construction to be capable of withstanding the high pressures at which the separator may be operated. The float device (Fig. 2) is made up of a solid spherical member 14 which is constructed of a low specific gravity material such as aluminum, Bakelite, magnesium alloy or the like, and buoyancy is attained through the provision of an arm 15 interconnecting the solid member 14 with a counterbalancing element 16 of a higher specific gravity and of less mass. A shaft 17 has one end secured to the arm 15 at a point 18 which is selected in accordance with the respective weights of the elements 14 and 16, and the length of arm 15 in order that the element 14 with not be quite counterbalanced, but will ride at the surface of the liquid as indicated in Fig. 1.

Variations in the liquid level in the separator are transmitted by the float device to shaft 17 which extends through a nipple 19 in the side wall of the separator. The shaft 17 is packed in a manner to provide an effective seal and prevent leakage of the high pressure gas by the utilization of elastic rings 20 which preferably are of neoprene rubber. Through the packing nut 21 the rings 20 are compressed about the shaft 17 until the rings effect a substantial bond with the shaft, but due to the elasticity of the rings the shaft is permitted to rotate sufficiently to operate other parts of the system, such as pilot valve 22 for effecting discharge of liquid from the separator.

Figure 3:
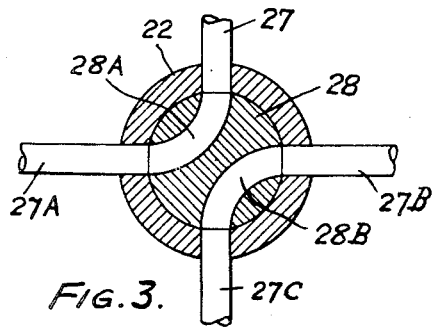
Fig. 3 is an enlarged sectional view showing details of a portion of the apparatus.

The conduit 13 is provided with a discharge valve 23 which is moved to opened or closed position with its valve seat by a diaphragm 24 secured to valve stem 25 and disposed within housing 26 to which is supplied a portion of the gas from separator 10 through gas line 27 for actuation of the diaphragm. The pilot valve 22 (heretofore referred to and shown in detail in Fig. 3) comprises a multiple way valve having a rotor 28 connected to and activated by shaft 17 through movement of float member 14 to place port 28A in communication with gas line 27 and branch line 27A to supply gas to the bottom side of diaphragm 24 (as shown in Fig. 1) for raising the valve 23 from its valve seat to discharge liquid from the separator when the level of liquid in the separator 10 reaches its predetermined upper limit. As the liquid level in the separator falls, the movement of rotor 28 will be reversed, and port 28B placed in communication with gas line 27 and branch line 27B to supply the gas to the top side of diaphragm 24 to close the discharge valve 23. When port 28A is in communication with lines 27 and 27A, port 28B will be in communication with line 27B and exhaust line 27C to release gas from the top side of the diaphragm to the atmosphere and conversely port 28A will be in communication with lines 27A and 27C to release gas from the bottom side of the diaphragm when lines 27 and 27B are placed in communication by port 28B. The valve stem 25 will be suitably packed to control diaphragm actuating pressure as well as separator pressure.

In order to utilize high pressure, high temperature gas from separator 10 to operate the discharge valve 23, a pressure regulator 30 is provided and is set to reduce the pressure of the high pressure gas to a suitable operating pressure, for example, to a pressure between 5 and 100 pounds per square inch. This gas upon expanding is reduced in temperature, which may go well below freezing, thus forming hydrates which plug the lines following the reducing regulator and, consequently, rendering the pilot valve 22 and discharge valve 23 inoperative. In order to overcome this difficulty of operation, the pressure reducing regulator 30 is disposed in the gas discharge conduit 12 in a manner to heat exchange the cool low pressure gas with the relatively high temperature, high pressure gas. To this end, the pressure reducing regulator is made up of an elongated tube 31, having an open end positioned within conduit 12 for receiving the high pressure gas and a valve 32 cooperating therewith for controlling the passage of gas to the tube. The valve 32 is provided with a stem 33 which is actuated through a diaphragm 34 enclosed in housing 35 and is set by the spring 36 and adjusting screw 37 to reduce the gas pressure as desired. The high pressure gas admitted by valve 32 to the tube 31 will be expanded within the tube and reduced to the desired pressure before it is directed to conduit 27 from the housing 35. The tube 31 may be of any desired length and is preferably constructed of a material having high heat conductivity such as brass and may be suitably finned to increase heat transfer. As the gas at reduced pressure flows through the tube 31, the high pressure, high temperature gas in conduit 12 will heat up, or sufficiently warm the gas in the tube 31 so that it will be transferred from the housing 35 to the conduit 27 in proper condition to insure the efficient and automatic operation of the liquid discharge valve 23.

It will be appreciated that the pressure regulator 30 although described in connection with a float system particularly adapted for a high pressure separator is capable of numerous other applications in reducing high pressure gas to a desired useful low pressure, such as, for example, fuel supply for small internal combustion engines, low pressure gas for illumination purposes and other types of pressure reduction where relatively small quantities of low pressure gas are required from a high pressure flowing source.

I claim:

1. Means for regulating the discharge, for special use, from a flowing stream of high pressure high temperature gas, of a part of said gas at a relatively low pressure but at a temperature above a predetermined minimum, which comprises a conduit having an inlet and an outlet portion through which said stream of high pressure gas is adapted to flow continuously, a housing enclosing a low pressure chamber and in open communication therewith a gas discharge chamber, the low pressure chamber having an inlet for admission thereto of gas from said conduit, a valve controlling the rate of flow of gas from said conduit through said inlet into the low pressure chamber, pressure-responsive means, subject to the pressure in the gas-discharge chamber, connected with and controlling said valve, said low-pressure chamber extending into said conduit to thereby effect direct heat-exchange between the gas in the low-pressure chamber and the gas in said conduit, thus conditioning the gas discharged from the gas-discharge chamber for said special use.

2. In combination, a conduit having an inlet and an outlet portion for the continuous removal of high pressure gas from a source, a housing having a low pressure chamber at one end positioned within the conduit and a gas discharge chamber at its other end, said chambers being in communication, said low pressure chamber having an aperture providing a valve seat, a valve stem, a valve plug at one end of the valve stem cooperating with said valve seat and pressure-responsive means at the other end of the valve stem subject to the pressure within the discharge chamber and thus positioning the valve plug and regulating the passage of gas from the conduit into the low pressure chamber, said low pressure chamber of the housing being heated by the high pressure gas flowing through the conduit to thereby condition the low pressure gas for further use before passage from the discharge chamber.

3. The construction defined in claim 2 in which the gas discharge chamber is located exteriorly of the conduit.

WILLIAM E. BARNES.

REFERENCES CITED

The following references are of record in the file of this patent:

UNITED STATES PATENTS

| Number | Name | Date |
|---|---|---|
| 1,484,394 | Jenkins | Feb. 19, 1924 |
| 1,567,313 | Wilson | Dec. 29, 1925 |
| 1,846,376 | Walker | Feb. 23, 1932 |
| 1,953,603 | Hardy | Apr. 3, 1934 |
| 1,999,808 | Goodman | Apr. 30, 1935 |
| 2,023,915 | Connell | Dec. 10, 1935 |
| 2,050,750 | Drummond | Aug. 11, 1936 |
| 2,056,420 | Colby | Oct. 6, 1936 |
| 2,171,394 | Christian | Aug. 29, 1939 |